Figure 3:
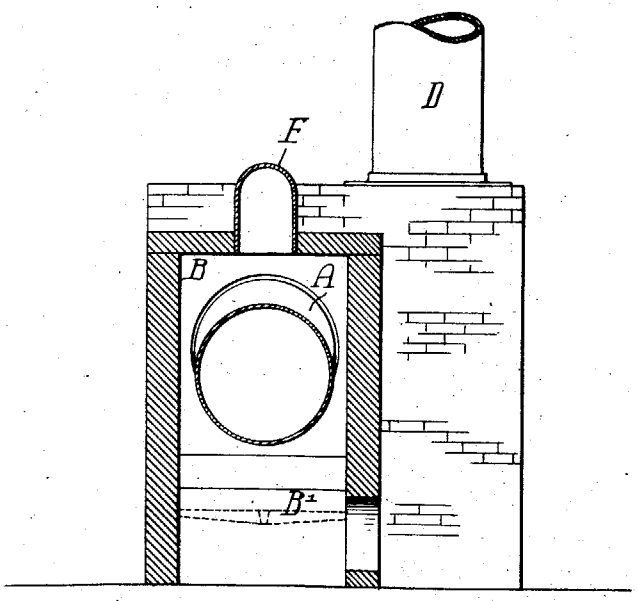

No. 12,474. REISSUED APR. 24, 1906.
C. A. MATCHAM.
DRIER.
APPLICATION FILED MAR. 26, 1906.
2 SHEETS—SHEET 1.
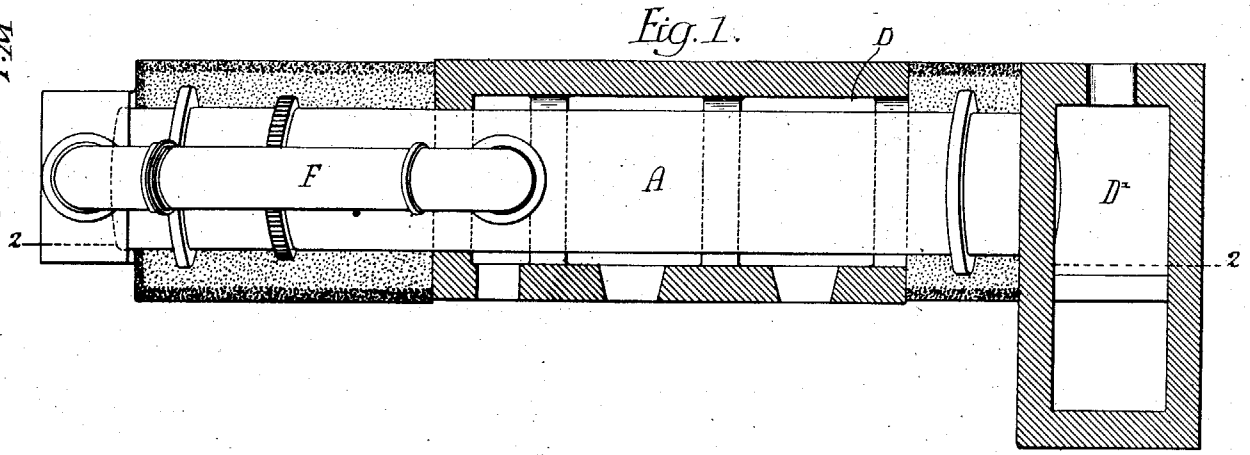
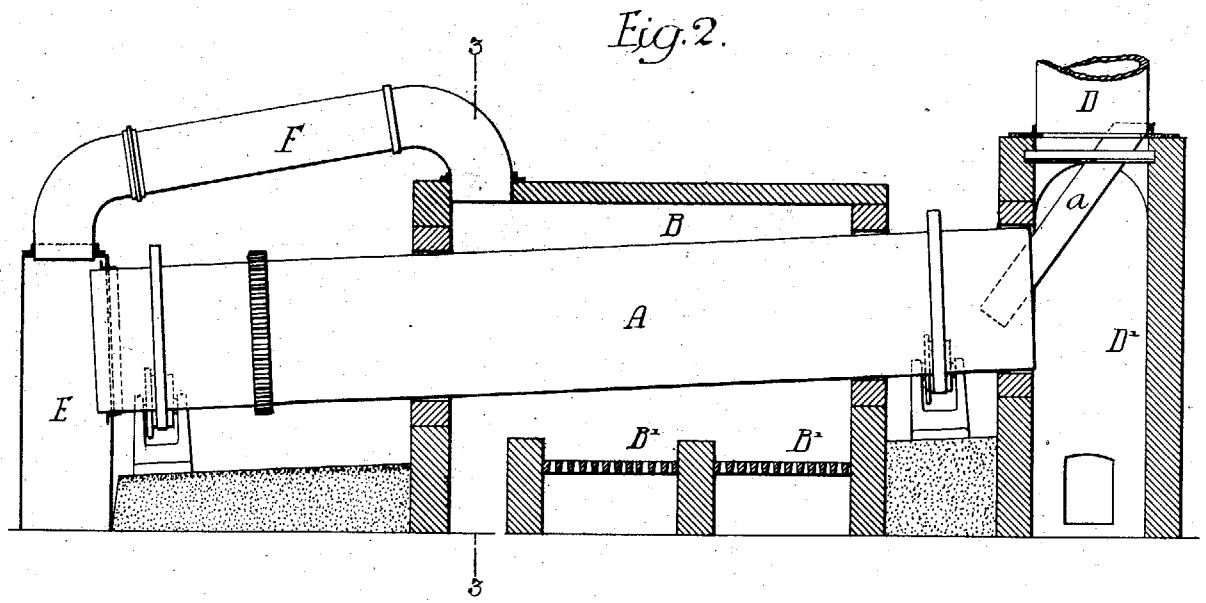
Witnesses:-
Wills A. Burrowes
Walter R. Pullinger
Inventor:-
Charles A. Matcham.
by his Attorneys;
Hymm & Hymm No. 12,474. REISSUED APR. 24, 1906.

C. A. MATCHAM.

DRIER.

APPLICATION FILED MAR. 26, 1906.

2 SHEETS—SHEET 2.

Witnesses:-
Titus H. Gross.
Miller A. Burrowes

Inventor.
Charles A. Matcham.
by his Attorneys.
Howson & Howson

UNITED STATES PATENT OFFICE.

CHARLES ARTHUR MATCHAM, OF ALLENTOWN, PENNSYLVANIA.

DRIER.

No. 12,474. Specification of Reissued Letters Patent. Reissued April 24, 1906.

Original No. 783,970, dated February 28, 1905. Application for reissue filed March 26, 1906. Serial No. 308,190.

*To all whom it may concern:*

Be it known that I, CHARLES ARTHUR MATCHAM, a citizen of the United States, residing in Allentown, county of Lehigh, State of Pennsylvania, have invented certain Improvements in Driers, of which the following is a specification.

The object of my invention is to so construct an apparatus for drying raw material—such as lime, clay, cement, coal, or other material—that the products of combustion will first pass around the shell of the cylindrical drying-drum and then pass through the cylindrical drum to the stack, as fully described hereinafter.

In the accompanying drawings, Figure 1 is a plan view of my improved drier, showing the furnace and stack in section. Fig. 2 is a longitudinal sectional view on the line 2 2, Fig. 1; and Fig. 3 is a transverse section on the line 3 3, Fig. 2.

A is the cylindrical drying-drum, preferably inclined, as shown in Fig. 2, and mounted on any suitable supports and rotated in any suitable manner. The central portion of the drier is surrounded by a furnace B, having in the present instance two fire-chambers B′ B′. The inlet end of the drum A extends into the base D′, which supports the stack D, while the opposite end of the drum extends into a chamber E, through which the material is discharged. This chamber E is connected to the upper portion of the furnace B by a flue F, which is preferably inclined, as shown in Fig. 2, and of sufficient d ameter to carry the products of combustion from the furnace into the chamber E, the products of combustion passing from this chamber E through the drum A into the base portion of the stack and through the stack, so that the furnace B has a natural draft, drawing the products of combustion from the upper portion of the furnace through the drum. The coupling with the furnace may be at any point desired; but I prefer to couple the flue to the furnace, as shown in the drawings.

The material is fed into the drum A through an inclined chute *a* and is discharged at the opposite end through the chamber E into any suitable hopper or bin.

It will be seen by my invention that as the drum A, which is, in fact, a kiln, rotates the middle portion is heated to a degree to thoroughly dry the material traveling through the drum, while the products of combustion from the furnace are collected and pass through the flue F, into the chamber E and through the drum A, causing the material in the drum to be heated directly by the products of combustion, which finally pass out the inlet end of the drum to the stack, the stack making the necessary induced draft.

I claim—

1. The combination in a drier, of an inclined drum, bearings at each end supporting said drum, an annular rack on the drum by which it is rotated, a furnace inclosing a portion only of said drum, a chamber with which the outlet end of the drum communicates, an outside flue extending from the furnace to the chamber, and a stack with which the inlet end of the drum communicates, so that the products will pass around a portion of the drum, then through the flue to the interior of the drum to the stack, substantially as described.

2. The combination in a drier, of an inclined drum, bearings at each end supporting said drum, an annular rack on the drum by which it is rotated, a furnace inclosing a portion only of said drum, a chamber with which the outlet end of the drum communicates, a flue extending from the upper portion of the furnace to the chamber, and a stack with which the inlet end of the drum communicates so that the products of combustion will pass around the drum to the upper portion of the furnace, then through the flue to the interior of the drum to the stack, substantially as described.

In testimony whereof I have signed my name to this specification in the presence of two subscribing witnesses.

CHARLES ARTHUR MATCHAM.

Witnesses:
WILL. A. BARR,
JOS. H. KLEIN.